United States Patent
Leiteritz et al.

(10) Patent No.: US 9,040,868 B2
(45) Date of Patent: May 26, 2015

(54) PLASMA TORCH AND RETAINING CAP WITH FAST SECURING THREADS

(75) Inventors: Nathan Gerald Leiteritz, Little Chute, WI (US); George Arthur Crowe, Claremont, NH (US)

(73) Assignee: Illinois Tool Works Inc., Glenview, IL (US)

( * ) Notice: Subject to any disclaimer, the term of this patent is extended or adjusted under 35 U.S.C. 154(b) by 234 days.

(21) Appl. No.: 13/213,941

(22) Filed: Aug. 19, 2011

(65) Prior Publication Data

US 2013/0043222 A1    Feb. 21, 2013

(51) Int. Cl.
| | |
|---|---|
| *B23K 10/00* | (2006.01) |
| *B23K 9/013* | (2006.01) |
| *B23K 9/28* | (2006.01) |
| *H05H 1/34* | (2006.01) |

(52) U.S. Cl.
CPC .............. *B23K 9/013* (2013.01); *B23K 9/287* (2013.01); *B23K 10/00* (2013.01); *H05H 1/34* (2013.01); *H05H 2001/3457* (2013.01)

(58) Field of Classification Search
CPC .................................. B23K 10/00; H05H 1/26
USPC ............... 219/121.39, 121.44, 121.5, 121.45, 219/121.51, 121.48, 74, 75; 313/231.41, 313/231.51; 315/111.21
See application file for complete search history.

(56) References Cited

U.S. PATENT DOCUMENTS

| | | | |
|---|---|---|---|
| 4,954,688 A | 9/1990 | Winterfeldt | |
| 5,013,885 A | 5/1991 | Carkhuff et al. | |
| 5,114,286 A * | 5/1992 | Calkins | 408/226 |
| 5,124,525 A | 6/1992 | Severance, Jr. et al. | |
| 5,162,632 A * | 11/1992 | Carkhuff | 219/121.5 |
| 5,164,568 A | 11/1992 | Sanders | |
| 5,170,033 A | 12/1992 | Couch, Jr. et al. | |
| 5,208,448 A | 5/1993 | Everett | |
| 5,310,988 A | 5/1994 | Couch, Jr. et al. | |
| 5,726,415 A | 3/1998 | Luo et al. | |
| 5,893,985 A | 4/1999 | Luo et al. | |
| 5,965,045 A | 10/1999 | Zigliotto | |
| 6,162,001 A * | 12/2000 | Goodwin et al. | 411/386 |
| 6,207,923 B1 | 3/2001 | Lindsay | |
| 6,215,090 B1 | 4/2001 | Severance, Jr. et al. | |
| 6,424,082 B1 | 7/2002 | Hackett et al. | |
| 6,472,631 B1 | 10/2002 | Eickhoff et al. | |
| 6,614,001 B2 | 9/2003 | Hackett et al. | |
| 6,852,943 B2 | 2/2005 | Eickhoff et al. | |
| 6,974,929 B2 | 12/2005 | Walters | |
| 6,998,566 B2 | 2/2006 | Conway et al. | |
| 7,005,600 B2 | 2/2006 | Conway et al. | |
| 7,132,619 B2 | 11/2006 | Conway et al. | |

(Continued)

FOREIGN PATENT DOCUMENTS

| | | |
|---|---|---|
| CN | 201159232 Y | 12/2008 |
| EP | 1802179 A2 | 6/2007 |

OTHER PUBLICATIONS

PCT International Search Report & Written Opinion of PCT/US2012/051275 dated Dec. 6, 2012.

*Primary Examiner* — Mark Paschall
(74) *Attorney, Agent, or Firm* — Fletcher Yoder P.C.

(57) ABSTRACT

A retaining cap for a plasma torch is provided that includes fast securing threads. The retaining cap includes internal threads that couple to external threads of a torch body of the plasma torch. The internal and external threads may be multiple start threads having a thread angle greater than 60°. Plasma torches and plasma cutting systems are also provided.

20 Claims, 11 Drawing Sheets

(56) References Cited

U.S. PATENT DOCUMENTS

| | | |
|---|---|---|
| 7,179,036 B2 | 2/2007 | Griffin et al. |
| 7,762,830 B2 | 7/2010 | Roberts |
| 2003/0209525 A1 | 11/2003 | Walters |
| 2007/0138148 A1 | 6/2007 | Severance, Jr. |
| 2008/0011702 A1* | 1/2008 | Walsh .............................. 215/44 |

* cited by examiner

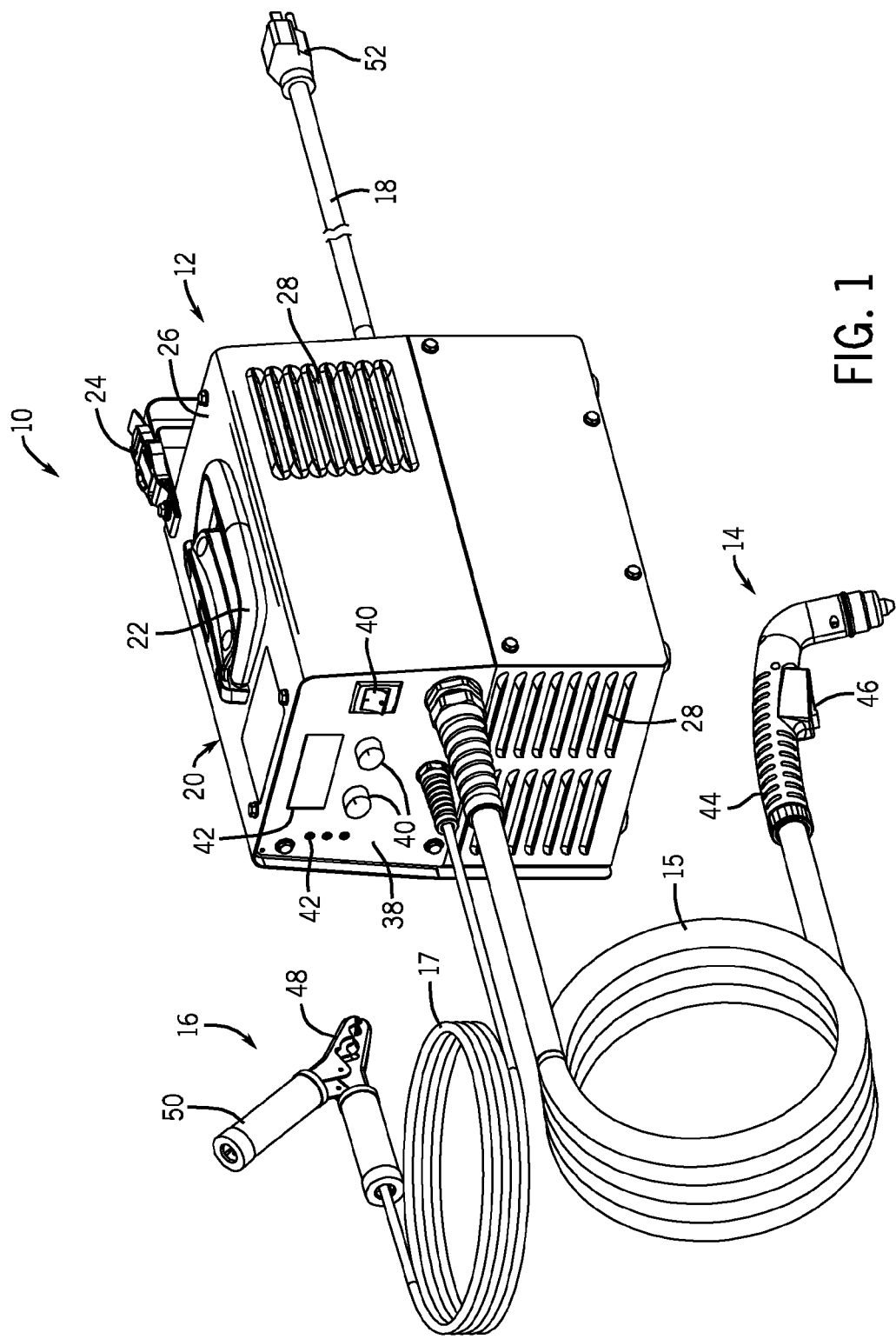

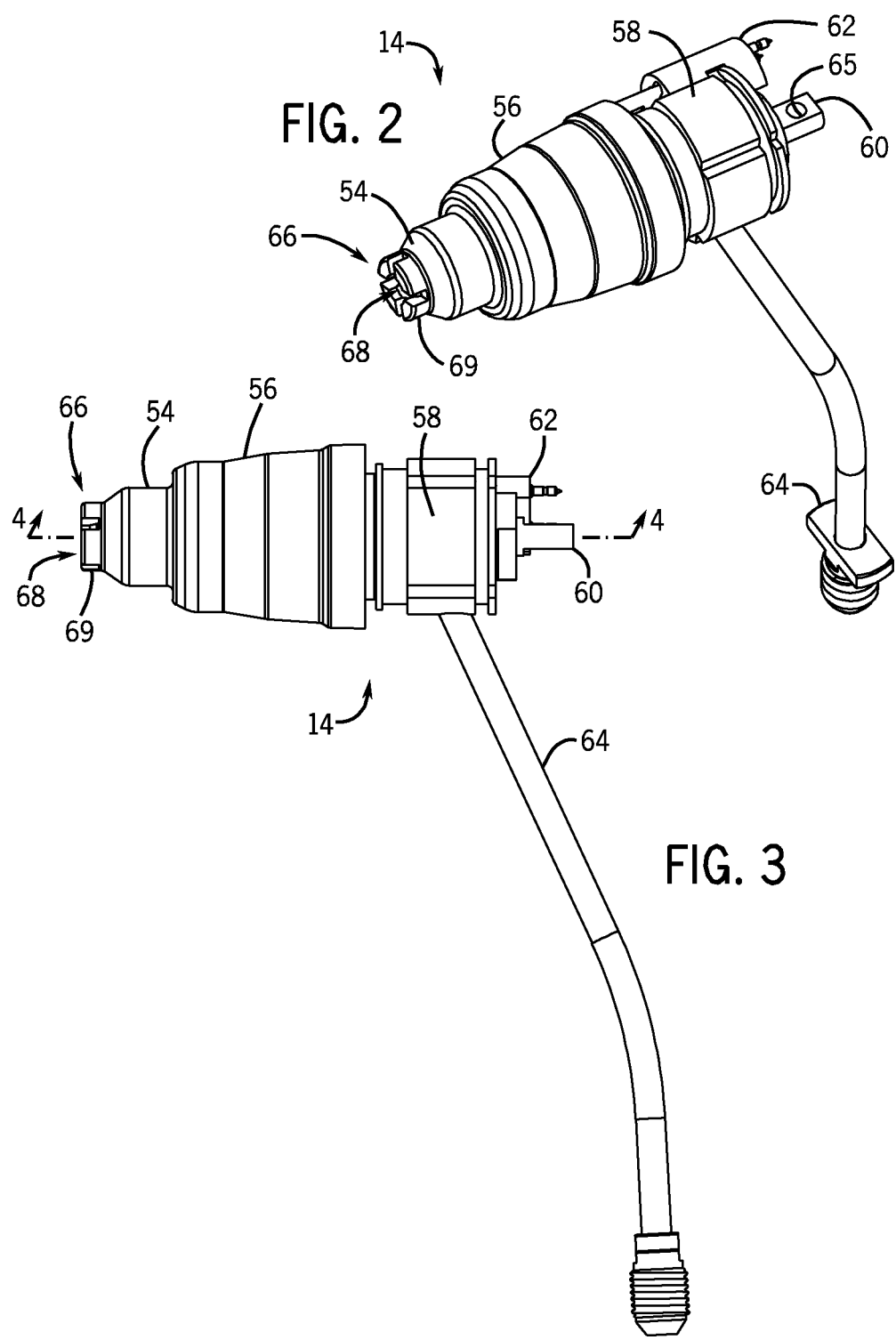

PLASMA TORCH AND RETAINING CAP WITH FAST SECURING THREADS

BACKGROUND

The invention relates generally to plasma cutting systems and, more particularly, to a plasma torch for such systems.

BRIEF DESCRIPTION

A plasma cutting system creates plasma (from high temperature ionized gas) to cut metal or other electrically conductive material. In general, an electrical arc converts a gas (e.g., compressed air) into plasma, which is sufficiently hot to melt the work piece while the pressure of the gas blows away the molten metal. The electrical arc is initiated in a plasma torch, and gas flows through the torch. A plasma torch may include a number of components that are used for various functions in the torch. Such components may be difficult and costly to manufacture. Additionally such components may be difficult to install in and remove from the torch, while remaining secure during operation of the torch.

DRAWINGS

These and other features, aspects, and advantages of the present invention will become better understood when the following detailed description is read with reference to the accompanying drawings in which like characters represent like parts throughout the drawings, wherein:

FIG. 1 is a perspective view of a plasma cutting system in accordance with embodiments of the present invention;

FIG. 2 is a perspective view of a plasma torch in accordance with an embodiment of the present invention;

FIG. 3 is a side view of the plasma torch of FIG. 2 in accordance with an embodiment of the present invention;

DETAILED DESCRIPTION

Figure 4:
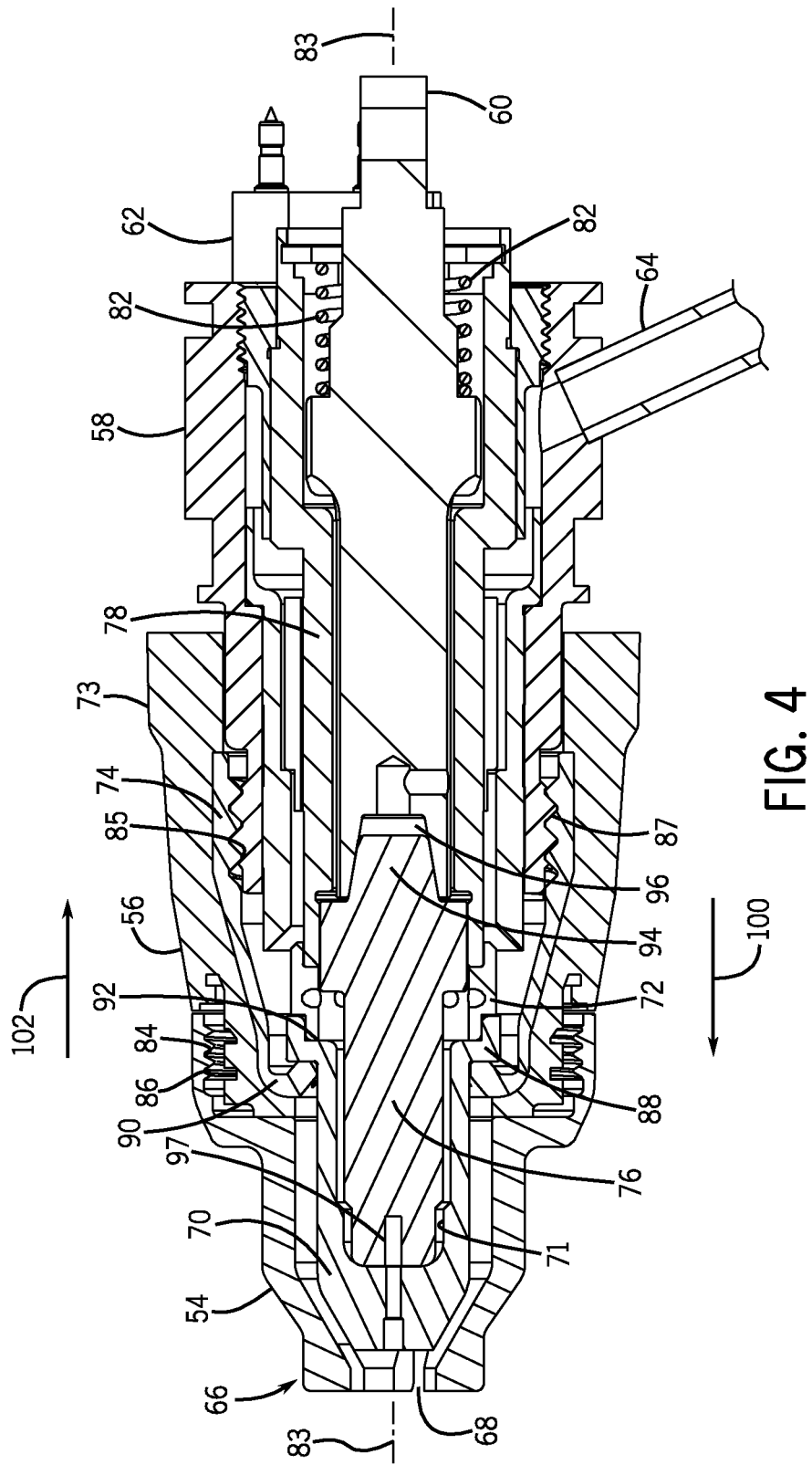
FIG. 4 is a cross-section taken along line 4-4 of FIG. 3 in accordance with an embodiment of the present invention.

As described further below, embodiments of the invention include a plasma torch retaining cap having multiple start threads with a thread angle greater than 60°. The retaining cap may be installed on and removed from a torch body having corresponding threads for engaging the multiple start threads of the retaining cap. The retaining cap may be installed or removed in about a single 360° rotation of the cap, e.g., slightly more or slightly less than a 360° rotation. The multiple start thread with the thread angle of greater than 60° may provide easier installation and removal of the cap, and the thread may provide resistance to over-tightening, and binding, such as due to dirt and debris build-up in the threads. Moreover, the selected thread angle improves the threaded locking forces to minimize or prevent inadvertent loosening of the retaining up during operation of the torch With the foregoing in mind, FIG. 1 is a perspective view illustrating an embodiment of a portable plasma cutting system 10 having a retaining cap with the features described above. The illustrated plasma cutting system 10 includes a torch power unit 12 coupled to a plasma torch 14 and a work piece clamp 16 via a torch cable 15 and a work piece cable 17, respectively. As described further below in FIGS. 2-10, the plasma torch 14 may include various features that provide improved performance and durability, easier assembly and replacement of components of the torch 14, and longer usage life. The torch power unit 12 may be coupled to a power source (e.g., a power grid or a motor-driven generator) via a power cable 18. As described further below, the power source may provide a current to the torch 14 for starting and generating a pilot arc, and for maintaining plasma and a cutting arc. For example, the power unit 12 may be configured to supply a suitable voltage and current to create an electrical circuit from the unit 12, along the cable 15 to the torch 14, across a gap between the torch 14 and a work piece (e.g., as an electrical arc), through the work piece to the clamp 16, through the cable 17 back to the unit 12.

The power unit 12 includes an enclosure 20 defining a generally closed volume to support various circuits, sensor features, control features, and gas supply features (e.g., air compressor). For example, the system 10 may include sensors and controls to adjust the power unit 10 to account for various conditions, e.g., altitude, temperature, pressure, and so forth. The illustrated system 10 also may include a handle 22 on the top side of the enclosure 20 to enable easier transportation of the system 10. The illustrated system 10 also may include a latching mechanism 24 that may secure the torch 14, the cable 17, the clamp 16, and/or the power 18. The enclosure 20 may also include vents 28 to relieve heat and/or pressure inside the system 10. Additional vents may be located on other panels of the enclosure 20.

In the illustrated system 10, a control panel 38 is included at an end of the power unit 12. The control panel 38 may include various control inputs, indicators, displays, electrical outputs, air outputs, and so forth. In an embodiment, a user input 40 may include a button, knob, or switch configured to enable selection of a mode of operation (e.g., plasma cut, gouge, etc.), power on/off, an output current level, gas (e.g., air) flow rate, gas (e.g., air) pressure, gas type, a work piece type, a control type (e.g., manual or automatic feedback control), or a combination thereof. The control panel 34 may also include various indicators 42 to provide feedback to the user. For example, the indicators 42 may include one or more light emitting diodes (LED) and/or liquid crystal displays (LCD) to display on/off status, current level, voltage level, gas (e.g., air) pressure, gas (e.g., air) flow, environmental conditions (e.g., altitude, temperature, pressure, etc.), or any other parameter. Additionally, the indicators 42 may include an LED or LCD that displays a trouble or warning indicator if there is a problem with the system 10. Embodiments of the control panel 38 may include any number inputs and outputs, such as welding methods, air compressor settings, oil pressure, oil temperature, and system power.

Further, the user inputs 40 and indicators 42 may be electrically coupled to control circuitry and enable a user to set and monitor various parameters of the system 10. For example, the indicators 42 may display environmental conditions (e.g., altitude, temperature, pressure, etc.) that prompt a user to manually adjust the current, voltage, gas flow rate, gas pressure, or other operational parameters, or a combination thereof.

The plasma torch 14 includes a handle 44 and a locking trigger 46, as well as various other components described below in FIGS. 2-10. The clamp 16 comprises an electrically conductive material clamping portion 48 having insulated handles 50. The power cable 18 includes a plug 52 for connection to a power source such as a wall socket or a motor-driven generator. The plug 52 may be configured to work with a variety of sockets or outlets, and the system 10 may receive different power sources, such as AC 50/60 Hz, 400 Hz, single or three phase 120V, 230V, 400V, 460V, 575V, etc, or any voltage in-between, and +20% maximum voltage and −20% of minimum voltage.

Turning now to the torch 14 in further detail, FIGS. 2 and 3 depict perspective and side views of the torch 14 respectively, in accordance with an embodiment of the present invention. As shown in FIGS. 2 and 3, the torch 14 may include a drag shield 54, a retaining cap 56, a torch body 58, and a plunger 60. As further depicted, the torch 14 may also include an electrical switch 62 and a gas connection 64. The switch 62 may include pins for electrical control/signal connections and may be used to detect the presence of the retaining cap 56. The plunger 60 may include a hole 65 provides for an electrical power connection to the torch 14.

As described further below, the retaining cap 56 may be quickly and securely installed via fast securing threads on the cap 56. As illustrated in further detail in FIGS. 5-10, the retaining cap 56 may include multiple start threads having a thread profile angle and thread pitch selected to prevent binding and provide easier installation and removal.

In some embodiments, different materials may be used to form the various components of the torch 14. The drag shield 54 may be formed from copper or other suitable metallic materials, or non-metallic, non-conductive materials such as plastic. The retaining cap 56 may be formed from a metallic material and a plastic, such as brass and thermoset plastics (e.g., Bakelite® or the like), fiberglass reinforced silicone (e.g., G7), or epoxy fiberglass tubing (such as that manufactured by I.D.S.I. Products of Savannah, Ga.). The torch body 58 may be formed from brass or other suitable metallic materials. As explained below, the drag shield 54 may be removably coupled to the retaining cap 56, and the drag shield 54 may be removed or installed without the use of tools. Additionally, the torch 14 and the drag shield 54 may include an exit portion 66 with an orifice 68 through which shielding and/or cooling gas flows out of the exit portion 66. The drag shield 54 may include various features, such as protrusions 69, to enable the drag shield 54 to be elevated from the workpiece and dragged across the work piece during cutting. In some embodiments, the electrical connection 65 and the gas connection 64 may connected to and/or enclosed in the torch cable 15, and in turn connected to the power unit 12.

FIG. 4 depicts a cross-section of the torch 14 taken along line 4-4 of FIG. 3 in accordance with an embodiment of the present invention. As mentioned above, the torch 14 includes the drag shield 54, the retaining cap 56, the torch body 58, the plunger 60, the switch 62, and the gas connector 64. As noted above, the drag shield 54 includes an orifice 68 located at the exit portion 66 of the drag shield 54. Additionally, various internal components of the torch 14 are shown in FIG. 4. The torch 14 may also include a nozzle 70 having an inner surface 71, a swirl ring 72, an electrode 76, a cathode body 78, and a spring 82. Additionally, the retaining cap 56 includes an outer cap member 73 and an inner cap member 74. In some embodiments, the outer cap member 73 may be formed from plastic and the inner cap member 74 may be formed from a metallic material, such as brass. Additionally, the various components of the torch 14 may be concentrically aligned and centered with respect to a longitudinal axis 83 of the torch 14. Together, the drag shield 54, the nozzle 70, the swirl ring 72, and the electrode 76 may be referred to as "consumables." Some or all of these consumables may wear, i.e., be consumed, during operation of the torch 14, and an operator may replace these worn consumables during the lifetime of the torch 14. Accordingly, the plasma torch 14 provides for toolless replacement, e.g., removal and installation without tools, of the consumables. For example, as shown in FIG. 4, the drag shield 54 may include interior threads 84 for coupling to exterior threads 86 of the retaining cap 56. Thus, the drag shield 56 may be removed and installed through the disengagement and engagement of the threads 84 and 86 and the threads 85 and 87.

Moreover, as described in detail below, the inner cap member 74 of the retaining cap 56 includes multiple start internal threads 85 for coupling to multiple start exterior threads 87 of the torch body 58. As described further below in FIGS. 5-10, the internal threads 85 (and corresponding threads 87 of the torch body 58) may enable easier installation of the retaining cap 56 and resistance to inadvertent loosening of the retaining cap 56 during operation of the torch 14.

As shown in FIG. 4, the nozzle 70 may include a shoulder end portion 88, and the inner cap member 74 of the retaining cap 56 includes an inner facing lip 90. Thus, the nozzle 70 may be retained by engagement of the inner facing lip 90 with the shoulder end portion 88. The swirl ring 72 may then be captured between an inner surface 92 of the shoulder end portion 88 of the nozzle 70 and the cathode body 78. Finally, as described further below the electrode 76 may include a frustoconical portion 94 and the plunger 60 may include a frustoconical-shaped recess 96. Thus, the electrode 76 may be partially or fully received by the frustoconical portion 94 in the recess 96. Additionally, the electrode 76 may include an emissive insert 97, such as a hafnium insert.

Based on the features described above, each consumable of the plasma torch 14 may be toollessly removed. For example, by removing the drag shield 54 from engagement with the retaining cap 56, and removing the inner cap member 74 from engagement with the torch body 58, the nozzle 70 may be removed from the torch 14. After removal of the nozzle 70, the electrode 76 may be removed from the torch 14. The frustoconical portion 94 may form a self-releasing angle contact with the recess 96 of the plunger 60, such that the electrode 76 is self-releasing from the torch 14.

Starting of the torch 14 will now be described with reference to FIG. 4. Embodiments of the torch 14 includes a "contact starting" mechanism such that the electrode 76 (i.e., the cathode) and the nozzle 70 (i.e., the anode) are in contact with one another during starting of the torch 14. Advantageously, such a contact starting mechanism does not require high frequency (HF) and high voltage (HV) power to start the pilot arc.

Before starting, the spring 82 may bias the electrode 76 in the direction indicated by arrow 100, toward the exit portion 66 of the torch 14, such that the electrode 76 is in contact with the nozzle 70. The power source 12 may provide a pilot current to cathodic elements, such as the electrode 76, the plunger 60, and the cathode body 78. Additionally, the pilot current is conducted to the anode, such as the nozzle 70. After electrical current begins to flow from the electrode 76 (cathode) to the nozzle 70 (anode) of the torch 14, pressurized gas, such as air or nitrogen, supplied to the torch 14 counteracts the spring force and moves the electrode 76 away from the nozzle 70, in the direction indicated by arrow 102 shown in FIG. 4. This breaks the electrical contact between the electrode 76 and the nozzle 70 and creates the pilot arc.

As the electrode 76 moves away from the nozzle 70, it opens a nozzle orifice and a plasma jet is created outward through the orifice of the nozzle 70 and the orifice 68 of the drag shield 54. When in relative proximity to the work piece, the plasma jet causes the arc to transfer (at least in part) to the work piece held by the clamp 16, thus initiating cutting. As shown in FIG. 4, the electrode 76 is then biased in the direction indicated by arrow 102 by the gas and plasma pressure at the exit portion 66 of the torch 14, such that the frustoconical portion 94 of the electrode is received in the recess 96 and maintains a good electrical/thermal connection. The electronics in the power source sense when the arc has transferred and then supply a main cutting current of greater amperage after the transfer has occurred. The nozzle 70 of the torch 14 is disconnected (electrically), interrupting the pilot current path. Thus, the current is used to cut the work piece, and follows a path including the positive terminal, the work piece and the electrode 76. For example, the power unit 12 may be configured to supply a suitable voltage and current to create an electrical circuit from the unit 12, along the cable 15 to the torch 14, across a gap between the torch 14 and a work piece (e.g., as an electrical arc), through the work piece to the clamp 16, through the cable 17 back to the unit 12.

Figure 5:
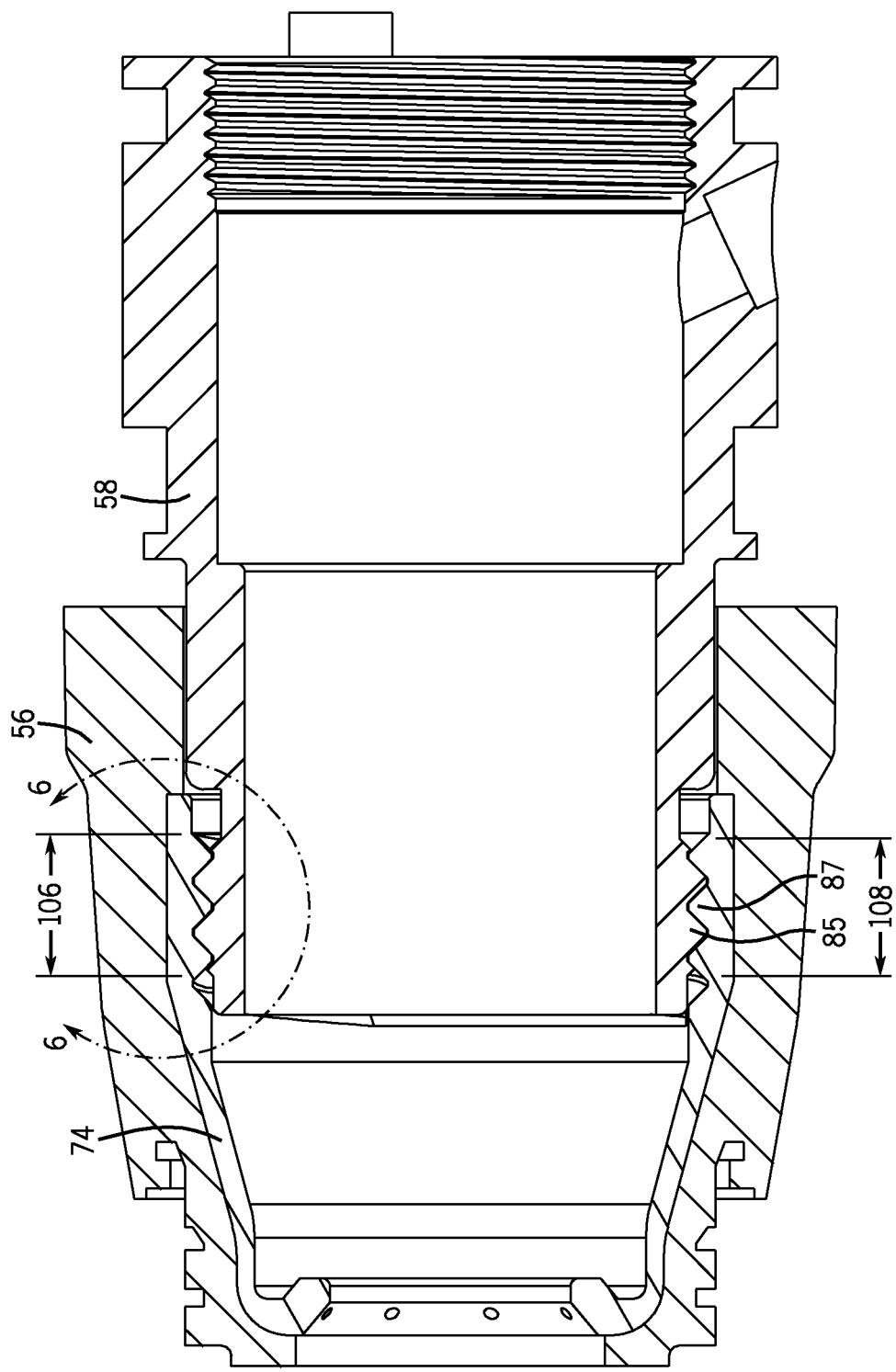
FIG. 5 is close-up cross-sectional view of the retaining cap and the torch body of the torch of FIG. 4 in accordance with an embodiment of the present invention.

FIG. 5 depicts a close-up cross-sectional view of the retaining cap 56 and the torch body 58 in further detail in accordance with an embodiment of the present invention. The other components of the torch 14 have been omitted from FIG. 5 for clarity. As shown in FIG. 5, the retaining cap 56 includes internal threads 85 on the inner cap member 74. As described above, the threads 85 engage the corresponding threads 87 of the torch body 58. The threads 85 and 87 are multiple start coarse threads having the features illustrated further below in FIGS. 6-8. In some embodiments, the threads 85 and 87 may be double start threads, such as modified double start M20 threads. As used herein, the term "multiple start" refers to a thread configuration in which the lead of the thread is an integral multiple, other than one, of the pitch. For example, for a double start thread, two "ridges" of the thread are included for each 360° rotation of the threaded body, e.g., the interior of the inner cap member 74 and the exterior of the torch body 58. Advantageously, the multiple start threads 85 and 87 enable the retaining cap 56 to be easier and faster to remove and install, such as when replacing worn consumables, and to be more robust and resistant to over-tightening, and binding, such as due to dirt and debris build-up in the threads 85 and 87. In other embodiments, the threads 85 and 87 may be a single start thread having a truncated minor diameter and the pitch of a multiple start thread.

As shown in FIG. 5, the threads 85 may have a length 106 extending along the length of the body 58. In some embodiments, the length 106 may be about 6.7 mm. Similarly, the threads 87 may have a length 108. In some embodiments, the length 108 may be about 5.35 mm.

Figure 6:
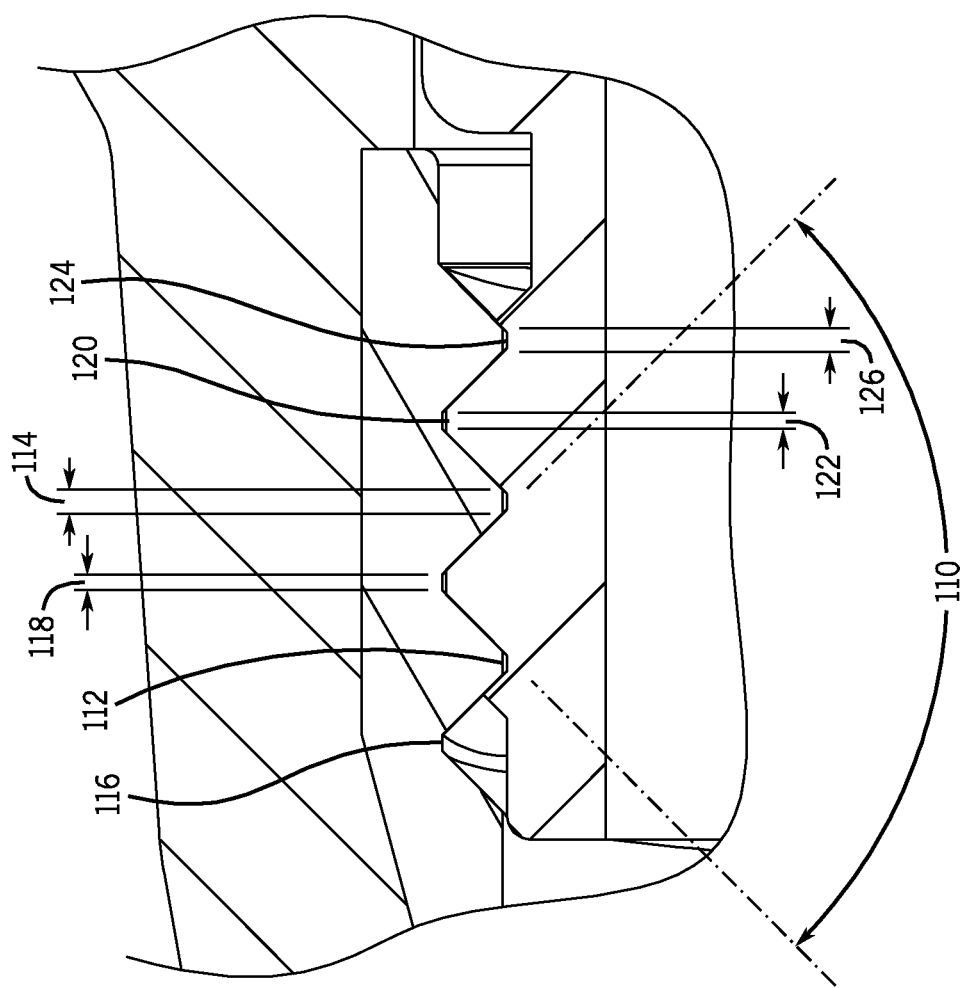
FIG. 6 is a close-up cross-sectional view taken along arcuate line 6-6 of FIG. 5 in accordance with an embodiment of the present invention.

FIG. 6 is a close-up view of the threads 85 and 87 taken along arcuate line 6-6 of FIG. 5 in accordance with an embodiment of the present invention. As mentioned above, in some embodiments the threads 85 and 87 may be multiple start coarse threads, such as double start M20 threads modified in the manner described herein. In other embodiments, the threads 85 and 87 may be any suitable multiple start coarse threads modified in the manner described herein, such as triple start threads, quadruple start threads, etc. As shown in FIG. 6, the threads 85 and 87 include a thread angle 110 of greater than about 60°. For example, in the illustrated embodiment the threads 85 and 87 may include a thread angle of about 90°. In other embodiments, the thread angle 110 may be about 65°, 70°, 75°, 80°, 85°, etc. Such a thread angle 110 increases the contact forces between the threads 85 and 87 to ensure that they secure the retaining cap 56 and prevent inadvertent loosening during operation of the torch 14, such as during thermal expansion, contraction and vibration experienced during such operation.

As shown in FIG. 6, the threads 85 include a crest 112 having a width 114 and a root 116 having a width 118. Similarly, the threads 87 include a crest 120 having width 122 and a root 124 having width 126. In some embodiments, the width 114 may be about 0.4 mm and the width 118 may be about 0.2 mm. Additionally, in some embodiments the width 122 may be about 0.2 mm and the width 126 may be about 0.2 mm.

Figure 7:
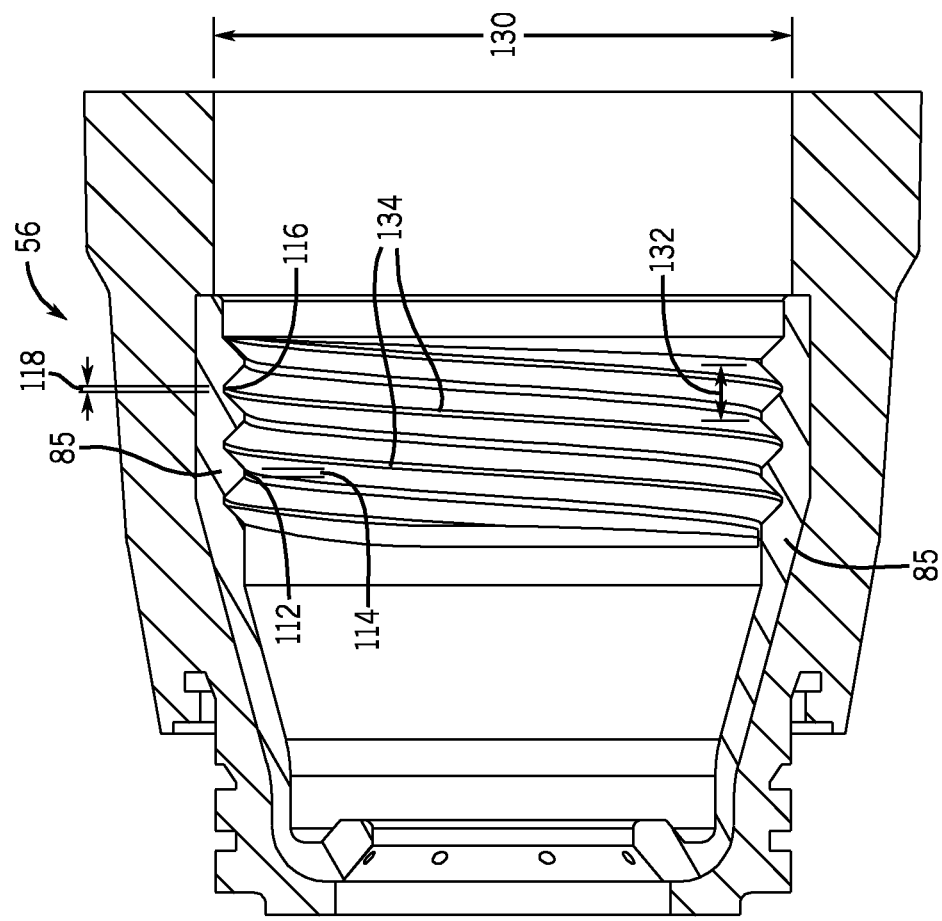
FIG. 7 is a side cross-sectional view of a retaining cap in accordance with an embodiment of the present invention.

FIG. 7 is a side cross-sectional view of the retaining cap 56 further illustrating the threads 85 in accordance with an embodiment of the present invention. As mentioned above, the threads 85 include the crest 112 having the width 114 and the root 116 having the width 118. The threads 85 also include a major diameter 130 and a pitch 132. In some embodiments, the major diameter 130 may be about 20.00 mm. Additionally, in some embodiment, the pitch 132 may be about 4 mm. Moreover, as shown in FIG. 7, the threads 85 are multiple start threads, such as double start threads having two "ridges" 134 of the threads 85 formed in a single 360° of the retaining cap 56.

Figure 8:
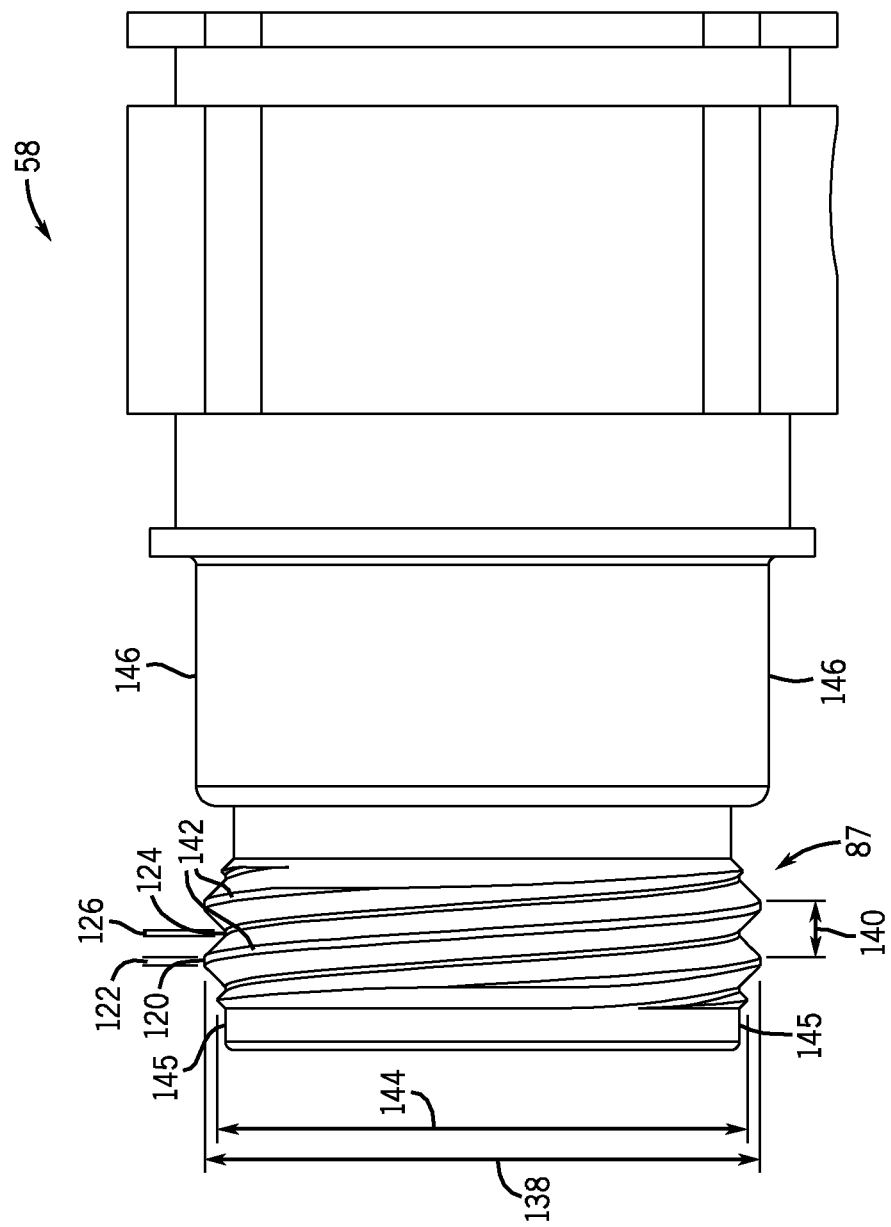
FIG. 8 is a side cross-sectional view of a portion a torch body in accordance with an embodiment of the present invention.

FIG. 8 is a side cross-sectional view of a portion of the torch body 58 further illustrating the threads 87 in accordance with an embodiment of the present invention. As mentioned above, the threads 87 include the crest 120 having the width 122 and the root 124 having the width 126. The threads 87 also include a major diameter 138 and a pitch 140. In some embodiments, the major diameter 138 may be about 19.95 mm. Additionally, in some embodiment, the pitch 140 may be about 4 mm. Moreover, as shown in FIG. 8, the threads are multiple start threads. For example, the threads 85 and 87 may be double start threads. Additionally, the threads 87 may have a pitch diameter 144 of about 19.1 mm. As further shown in FIG. 8, the torch body 58 may include a straight diameter (e.g., a flat outer surface) 145 before the threads 87 and a straight diameter (e.g., a flat outer surface) 146 after the threads 87. The straight diameters 145 and 146 may be used to center and align the torch body 58 for easier thread starting when securing the retaining cap 56 to the torch 14.

Figure 9:
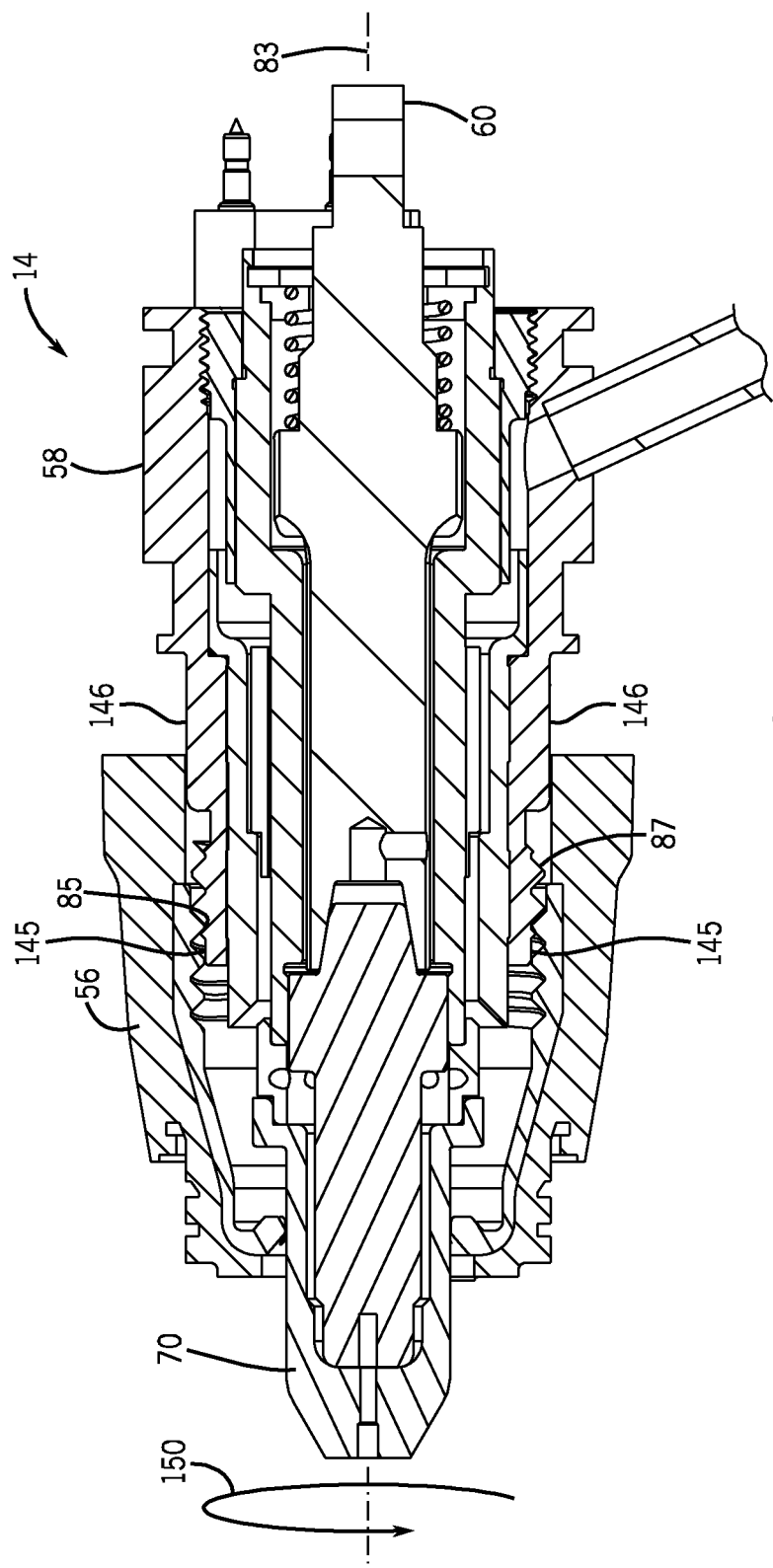
FIGS. 9 and 10 are cross-sectional views taken along line 4-4 of FIG. 3 in accordance with an embodiment of the present invention.
Figure 10:
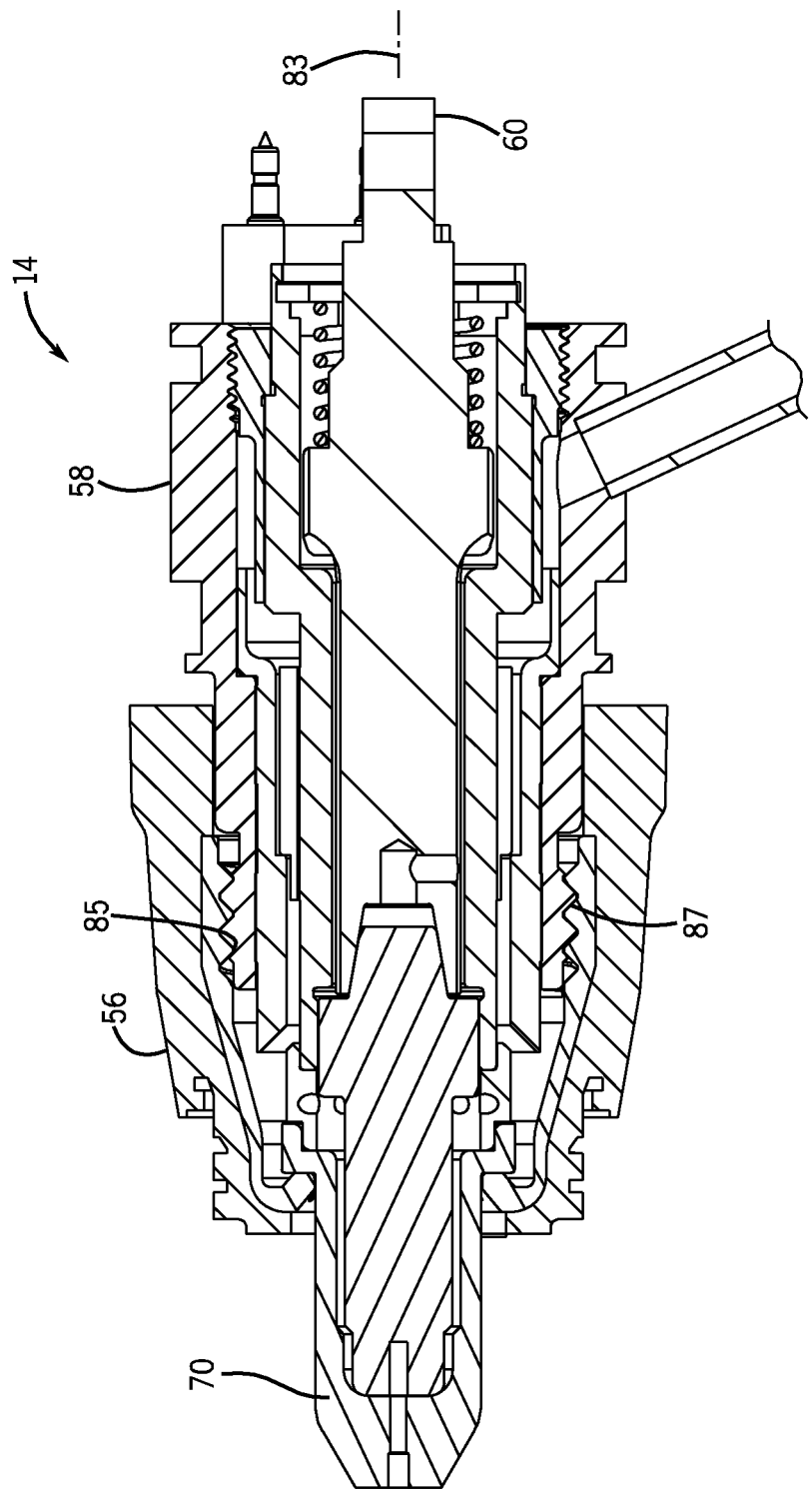

FIGS. 9 and 10 are cross-sectional views of the torch 14 depicting installation of the retaining cap 56 on the torch body 58 in accordance with an embodiment of the present invention. For clarity, FIGS. 9 and 10 depict the torch 14 with the drag shield removed. As shown in FIG. 9, the retaining cap 56 may be aligned with the torch body 58. For example, the first portion of the thread 85 may be aligned with the first of the thread 87, such that the retaining cap 56 is ready for installation. In such embodiments, alignment of the threads 85 and 87 aligns the retaining cap 56 with the central longitudinal axis 83 of the torch 14. Moreover, as further shown in FIG. 9, the minor diameter of the internal threads 85 may also be aligned and centered on the straight diameter 145. Additionally, the straight inner wall of the retaining cap 56 may be aligned and centered on the straight diameter 146.

To install the retaining cap 56, the cap 56 may be rotated in the direction indicated by line 150. As noted above, the retaining cap 56 may be fully installed with about a single 360° rotation of the cap 56, e.g., slightly greater than a single 360° rotation or slight less than a single 360° rotation. For example, as shown in FIG. 10, the cap 56 is fully secured on the torch body 58 after about a single 360° rotation of the retaining cap 56. Moreover, the threads 85 and 87 described require a relatively low application of torque to complete installation of the cap 56. Thus, the retaining cap 56 may be toollessly installed and removed from the torch 14. Additionally, as noted above, the threads 85 and 87 and are robust and resistant to over-tightening, and binding due to the build up of foreign particles in the threads. Moreover, the thread angle described above improves the threaded locking forces to minimize or prevent inadvertent loosening of the retaining up during operation of the torch 14.

Figure 11:
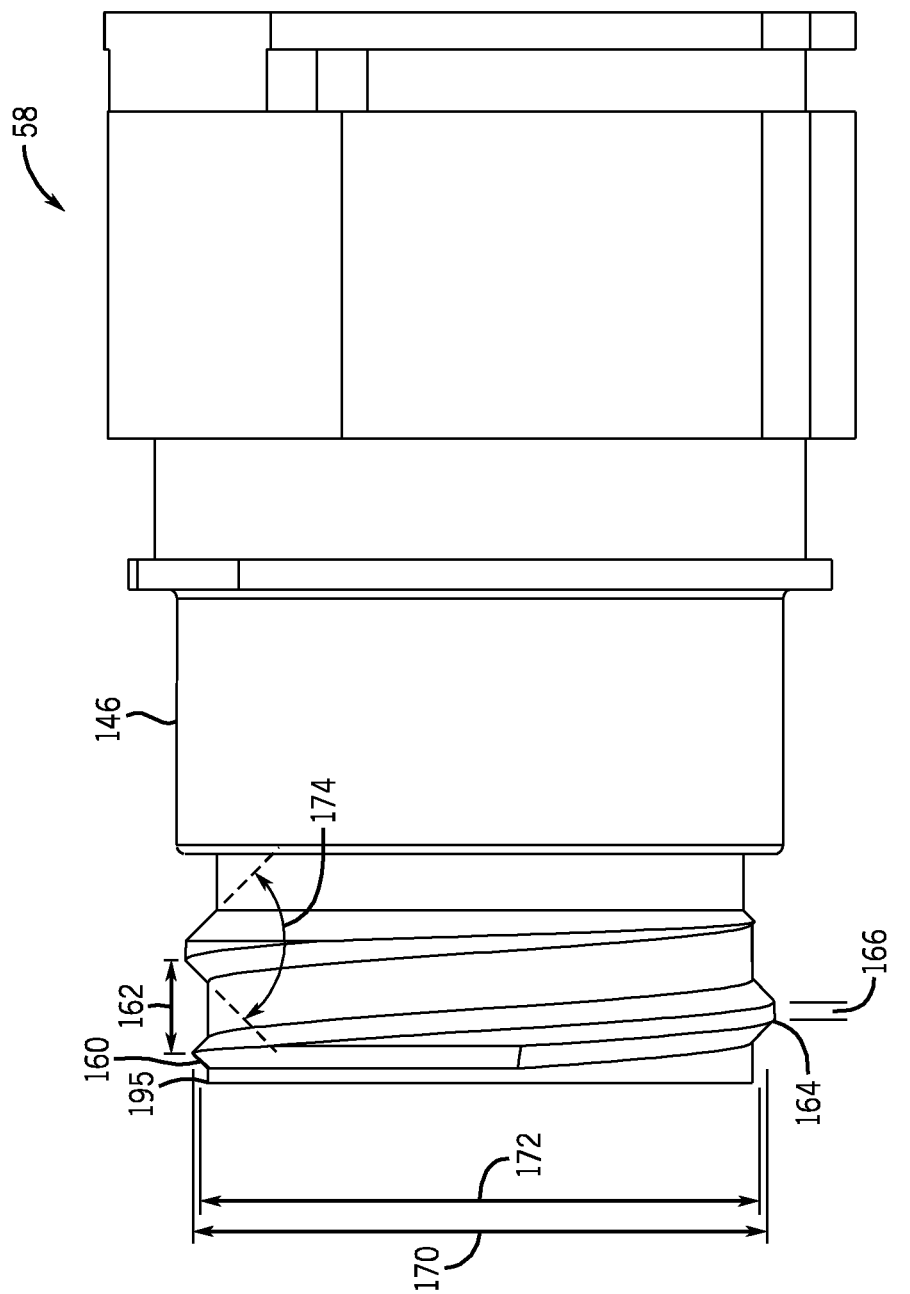
FIG. 11 depicts a torch body in accordance with another embodiment of the present invention.

As mentioned above, in other embodiments the threads of the retaining cap 56 and the torch body 58 may be single start threads having the pitch of a multiple start thread. FIG. 11 depicts a side view of the torch body 58 having external threads 160 having a pitch 162 in accordance with an embodiment of the present invention. The pitch 162 may be the pitch of a multiple start thread, e.g., the pitch of a double start thread. In one embodiment, the pitch 162 may be about 4 mm. The external threads 160 include a crest 164 having a width 166. The threads 160 also include a major diameter 170. Additionally, the threads 160 may have a pitch diameter 172. Moreover, as shown in FIG. 11, the threads 160 are single start threads. As used herein, the term "single start" refers to a thread configuration in which the lead of the thread is equal to the pitch. As shown in FIG. 11, the threads 160 include a thread angle 174 of greater than about 60°. For example, in the illustrated embodiment the threads 160 may include a thread angle 174 of about 90°. As mentioned above and as also shown in FIG. 11, the torch body 58 may include the straight diameter (e.g., a flat outer surface) 145 before the threads 160 and a straight diameter (e.g., a flat outer surface) 146 after the threads 160. As in the embodiments discussed above, the straight diameters 145 and 146 may be used to center and align the torch body 58 for easier thread starting when securing the retaining cap 56 to the torch 14. As will be appreciated, such an embodiment may include a retaining cap having corresponding internal threads for mating with the external threads 160, i.e., the retaining cap may include single start threads having the pitch of a double start thread and having a thread angle of greater than 60°, such as about 90°.

Figure 12:
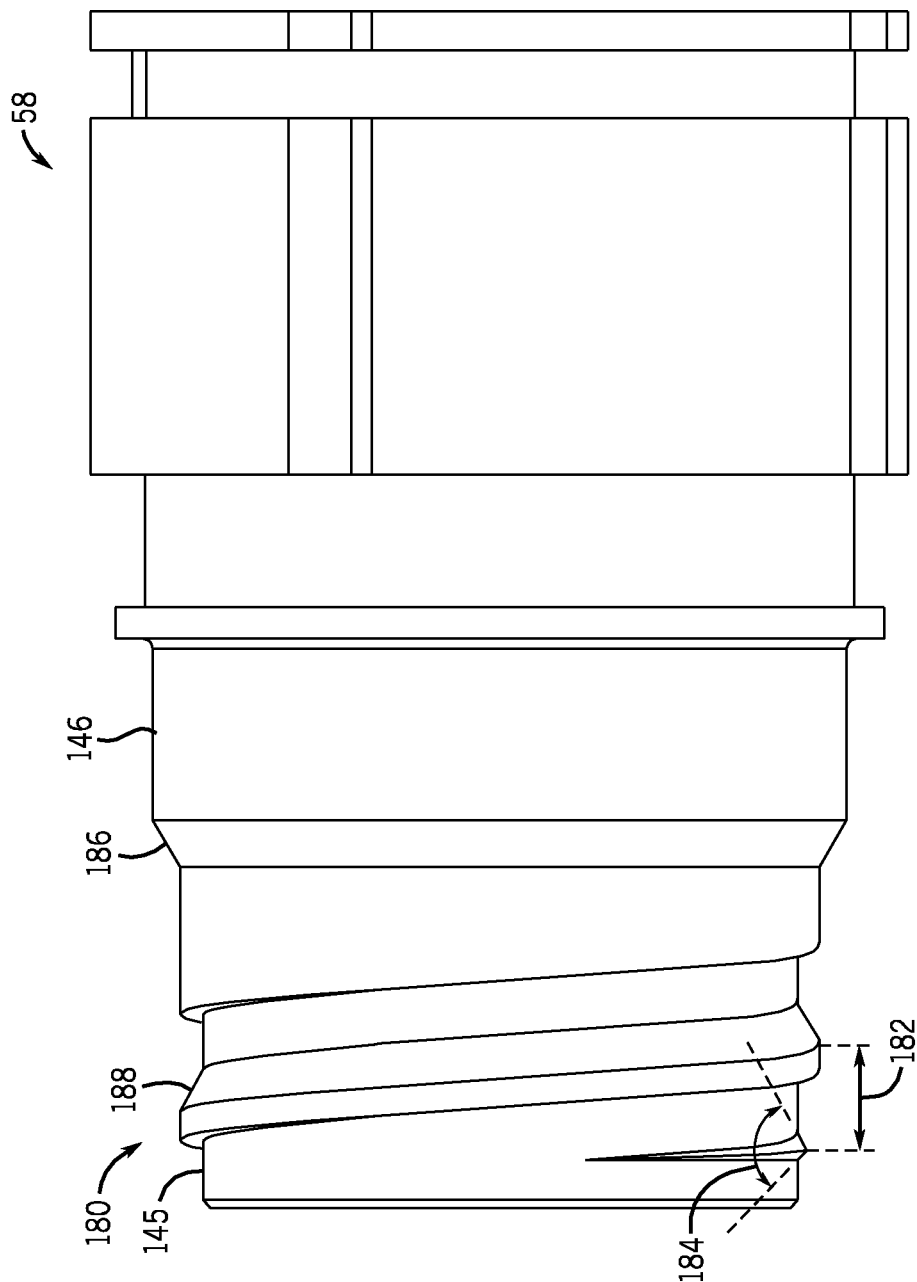
FIG. 12 depicts a torch body in accordance with another embodiment of the present invention.

In other embodiments the threads of the retaining cap 56 and the torch body 58 may be single start threads having the pitch of a multiple start thread. FIG. 12 depicts a side view of the torch body 58 having external threads 180 having a pitch 182 in accordance with an embodiment of the present invention. The pitch 180 may be the pitch of a multiple start thread, e.g., the pitch of a double start thread. In one embodiment, the pitch 182 may be about 4 mm. As shown in FIG. 12, the threads 180 include a thread angle 184 of greater than about 60°. For example, in the illustrated embodiment the threads 180 may include a thread angle 184 of about 90°. Moreover, as shown in FIG. 12, the threads 180 are single start threads. Additionally, the embodiment of the torch body 58 shown in FIG. 12 may include additional features to align and secure the retaining cap 56 when installed on the torch body 58. For example, as shown in FIG. 12, the torch body 58 may include a tapered seating shoulder 186 to center the retaining cap 56 when installed on the torch body 58. Additionally, the threads 180 may include a tapered flank 188 aft of the threads 180. The tapered seating shoulder 186 and the tapered flank 188 may "wedge" the retaining cap 56 between the shoulder 186 and the tapered flank 188, further securing the retaining cap when the cap 56 is installed on the torch body 58. As mentioned above and as shown in FIG. 12, the torch body 58 may include the straight diameter (e.g., a flat outer surface) 145 before the threads 180 and a straight diameter (e.g., a flat outer surface) 146 aft of the threads 180 to provide the centering and alignment of the retaining cap 56 discussed above. As will be appreciated, the embodiment described in FIG. 12 may include a retaining cap having corresponding internal threads for mating with the external threads 180, i.e., the retaining cap may include single start threads having the pitch of a double start thread and having a thread angle of greater than 60°, such as about 90°.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A plasma torch, comprising:
   a nozzle;
   a swirl ring adjacent to the nozzle;
   a torch body having first threads; and
   a retaining cap having second threads, wherein the first threads and the second threads comprise multiple start threads, each of the multiple start threads comprising a root and two walls extending from the root and having a thread angle between the two walls greater than about 60°, wherein the retaining cap retains the nozzle and the swirl ring of the plasma torch.

2. The plasma torch of claim 1, wherein the first threads and second threads comprise coarse threads.

3. The plasma torch of claim 1, wherein the first threads and second threads comprise a thread pitch of about 4 millimeters.

4. The plasma torch of claim 1, wherein the first threads comprise a first length and the second threads comprise a second length.

5. The plasma torch of claim 4, wherein the multiple start threads comprise double start threads.

6. The plasma torch of claim 1, comprising a moveable electrode comprising a frustoconical end portion.

7. The plasma torch of claim 6, comprising a moveable plunger configured to receive a portion of the electrode, wherein the moveable plunger is biased to a first position closer to a tip of the torch when the torch is non-operational and moved to a second position further from the tip when the torch is operational.

8. The plasma torch of claim 7, comprising a spring configured to bias the plunger to the first position.

9. A retaining cap for a plasma torch, comprising:
   a first portion comprising a metallic material; and
   a second portion comprising a plastic material, wherein the second portion comprises an annular inner wall comprising multiple start threads, wherein each of the multiple start threads comprises a root, two walls extending from the root, and a thread angle between the two walls of greater than 60°.

10. The retaining cap of claim 9, wherein the first portion comprises a lip configured to retain a nozzle of the plasma torch.

11. The retaining cap of claim 9, wherein the multiple start threads comprise double start threads.

12. The retaining cap of claim 9, wherein the multiple start threads comprises coarse threads.

13. The retaining cap of claim 9, wherein the multiple start threads comprise a crest having a first width and a root having a second width, wherein the first width comprises about 0.2 millimeters and the second width comprises about 0.4 millimeters.

14. The retaining cap of claim 9, wherein the multiple start threads comprise a thread pitch, wherein the thread pitch comprises about 4 millimeters.

15. A plasma torch, comprising:
a nozzle;
a swirl ring adjacent to the nozzle;
a torch body having first threads; and
a retaining cap having second threads, wherein the first threads and the second threads comprise single start threads having a pitch of a multiple start thread, wherein each of the single start threads comprises a root, two walls extending from the root, and a thread angle between the two walls greater than about 60°, and wherein the retaining cap retains the nozzle and the swirl ring of the plasma torch.

16. The plasma torch of claim 15, wherein the first threads and second threads comprise coarse threads.

17. The plasma torch of claim 15, wherein the first threads and second threads comprise a thread pitch of about 4 millimeters.

18. The plasma torch of claim 15, wherein the thread angle comprises about 90°.

19. The plasma torch of claim 15, wherein the torch body comprises a first straight diameter prior to the first threads.

20. The plasma torch of claim 16, wherein the torch body comprises a second straight diameter after the first threads.

* * * * *